April 4, 1950    H. CROCKER    2,503,098
BRICKLAYER'S PLUMB RULE
Filed March 9, 1949    2 Sheets-Sheet 1

INVENTOR.
Harry Crocker
BY Victor J. Evans & Co.
ATTORNEYS

April 4, 1950 H. CROCKER 2,503,098
BRICKLAYER'S PLUMB RULE
Filed March 9, 1949 2 Sheets-Sheet 2
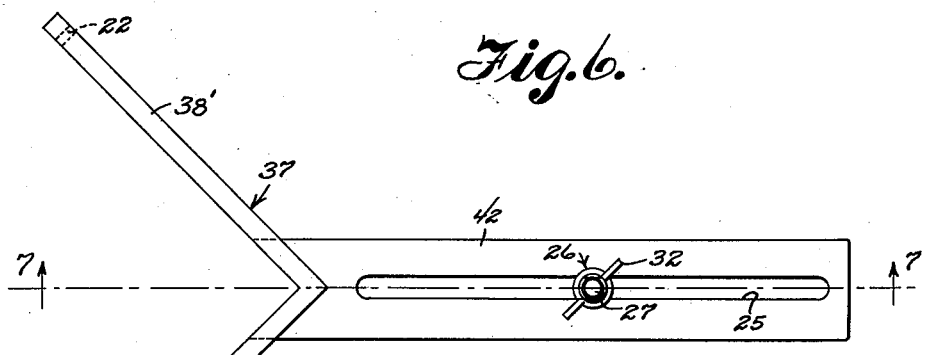
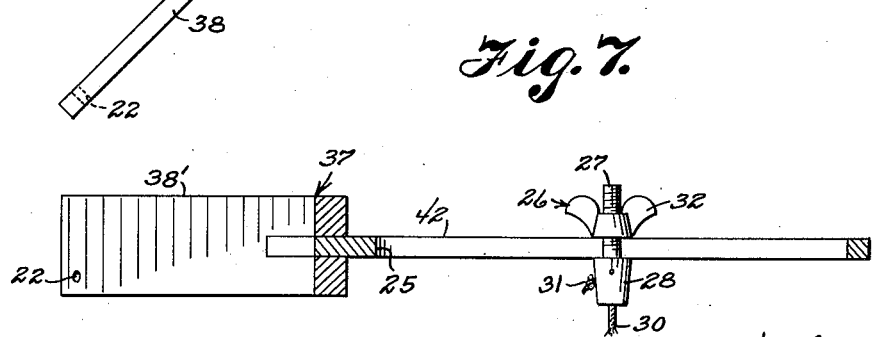
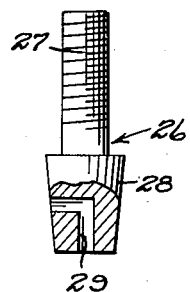
INVENTOR.
Harry Crocker
BY *Victor J. Evans & Co.*
ATTORNEYS Patented Apr. 4, 1950

2,503,098

UNITED STATES PATENT OFFICE 2,503,098

BRICKLAYER'S PLUMB RULE

Harry Crocker, Inwood, N. Y.

Application March 9, 1949, Serial No. 80,436

1 Claim. (Cl. 33—85)

This invention relates to a device for use by brick layers in erecting or repairing structures, and more particularly to a plumb rule for indicating a vertical direction.

The object of the invention is to provide a plumb rule which is adapted to be attached to a board or other support, for dependingly supporting a plumb line whereby a wall to be constructed can be aligned vertically as desired.

Another object of the invention is to provide a plumb rule which will enable the user to accurately form the corners of brick walls and the like, and which includes a calibrated arm for supporting the plumb line therefrom, whereby the device can be adjusted as desired for constructing walls of varying thicknesses.

Another object of the invention is to provide a plumbing device which is extremely simple and inexpensive to manufacture.

Other objects and advantages will be apparent during the course of the following description.

In the accompanying drawings forming a part of this application, and in which like numerals are used to designate like parts throughout the same:

Figure 6 is a top plan view of a modified plumb rule;

Figure 7 is a sectional view taken on the line 7—7 of Figure 6;

Figure 8 is an enlarged view of the slide bolt.

Figure 1:
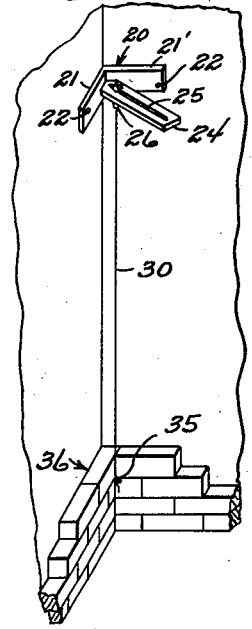
Figure 1 is a perspective view of the plumb rule in use, according to the present invention.
Figure 2:
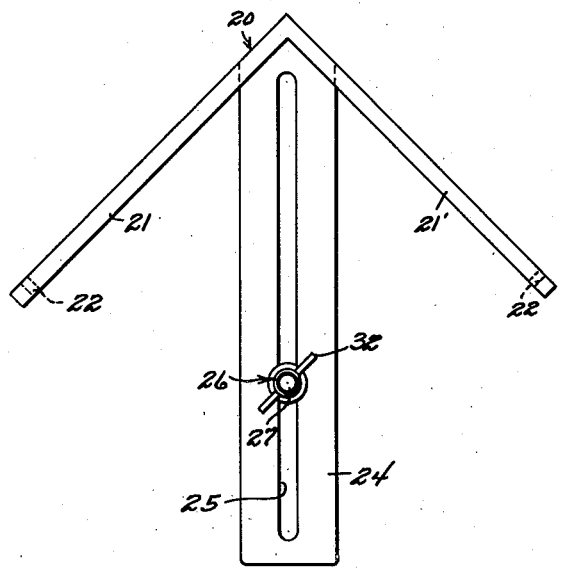
Figure 2 is a top plan view of the plumb rule.
Figure 3:
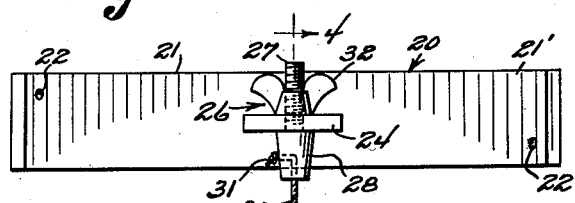
Figure 3 is an end elevational view of the plumb rule.

Referring in detail to the drawings, the numeral 20 designates a bracket, Figures 1 through 5. The bracket 20 may be made of any suitable material and comprises a pair of flat bars or legs 21 and 21' which are arranged at right angles with respect to each other and are secured together. Each of the bars 21 and 21' of the bracket 20 are provided with an aperture 22 for receiving therein a suitable securing element, such as a nail whereby the bracket 20 can be attached to a board or wall as desired.

Projecting from the bracket 20 and secured thereto, is a horizontally disposed arm 24 which is provided with an elongated longitudinally extending slot 25. Slidably arranged in the slot 25 is a slide bolt 26 which includes an exteriorly threaded shank 27 and an enlarged base 28, Figure 10. The base 28 of the slide bolt 26 is provided with an L-shaped bore 29 through which passes the upper end of a suitable plumb line 30. A suitable knot 31 may be tied in the line 30 to prevent accidental movement of the line 30 out of the bore 29. Arranged in threaded engagement with the shank 27 is a wing nut 32 which serves to maintain the slide bolt 26 immobile in its adjusted position.

Figure 4:
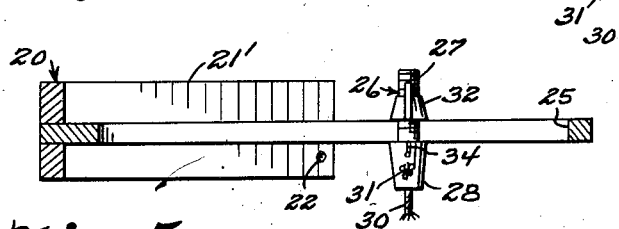
Figure 4 is a sectional view taken on the line 4—4 of Figure 3.
Figure 5:
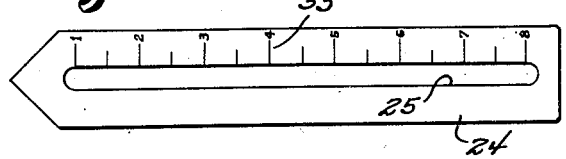
Figure 5 is a bottom plan view of the calibrated arm.

The undersurface of the arm 24 is provided with a calibrated scale or rule 33, Figure 5, and the base 28 of the slide bolt 26 is provided with a suitable marking line 34, Figure 4, which is adapted to be aligned with the scale 33 so that the position of the plumb line 30 can be set as desired as for construction of walls of varying thicknesses. The lower end of the plumb line 30 is adapted to be connected to a nail 35, Figure 1, and the nail is driven into the corner of the brick wall structure 36 so that the brick layer will be able to readily align the bricks so that the corner of the structure will be accurately formed.

Referring to Figures 6 and 7, the plumb rule has substantially the same structure as the plumb rule of Figures 1 through 5, except that the bracket 37 has its legs 38 and 38' extending in opposite directions from the legs of the bracket of the previously described device. Otherwise, the structure of the plumb rule is the same and the device of Figures 6 and 7 is adapted to be used where it is advantageous or necessary to have the legs 38 and 38' of the bracket 37 straddle a projecting corner of a structure.

In use, the bracket of the plumb rule is secured to a wall or other support member of a structure. Thus, in Figures 1 through 5, the angular bracket 20 is adapted to be secured to a pair of boards or adjacent walls of a structure, and the wing nut 32 is loosened so that the slide bolt 26 can be moved or adjusted along the arm 24 until the marking 34 coincides with the desired marking on the scale 33, whereupon the wing nut is tightened. The plumb line 30 depends from the base of the slide bolt 26 and the lower end of the line 30 is adapted to be tied or secured to a nail 35, Figure 1, which is driven into the wall structure 36 at the juncture of the walls. Thus, with the plumb line so laid out, the brick layer will have no difficulty in accurately placing subsequent bricks on the brick wall structure 36 and the plumb line 30 will insure that the corner is accurately aligned or formed. The bracket 37 of Figures 6 and 7 is adapted to be used where there is a projecting corner of a structure and again the slide bolt 26 is adapted to be moved along the arm 42 as desired. The scale 33 on the undersurface of the arm enables the user to adjust the device for various thicknesses of walls.

From the foregoing, it is apparent that a plumbing device has been provided which is especially useful to brick layers in putting up a wall structure which includes a pair of brick walls arranged at 90° with respect with each other. The bracket is adapted to be readily attached to the top of a sheeting board or other supporting structure and the measuring arm may be of any convenient length as desired. The plumb rule of the present invention is easy to operate since the slide bolt 26 can be positioned at the desired thickness of walls to be constructed, and the line 30 dropped and fastened to a securing element whereby the device can be used in the construcuton of either a straight side, angle or corner.

While I have shown and described preferred embodiments of my invention, this is by way of illustration only and I consider as my own all such modifications in construction as fairly fall within the scope of the appended claim.

I claim:

In a plumb rule, a bracket, said bracket comprising a pair of flat legs arranged at right angles with respect to each other and secured together, a horizontally disposed arm having one end arranged contiguous to the junction of said pair of legs and secured thereto, there being a slot extending longitudinally through said arm for the major portion of its length, a calibrated scale arranged on the lower surface of said arm, a slide bolt including an exteriorly threaded shank slidably arranged in said slot, said bolt further including a base of greater diameter than said shank arranged contiguous to the lower surface of said arm, a securing member arranged in threaded engagement with said shank for maintaining said slide bolt immobile in its adjusted position, a marking arranged on said base for coacting with said calibrated scale, there being an L-shaped bore in said base, and a plumb line having its upper end trained through said bore.

HARRY CROCKER.

REFERENCES CITED

The following references are of record in the file of this patent:

UNITED STATES PATENTS

| Number | Name | Date |
|--------|------|------|
| 1,824,321 | Baker | Sept. 22, 1931 |
| 1,943,017 | Harris | Jan. 9, 1934 |
| 2,343,688 | Maxey | Mar. 7, 1944 |
| 2,468,167 | Bucalo | Apr. 26, 1949 |
| 2,469,583 | Suverkrop | May 10, 1949 |

FOREIGN PATENTS

| Number | Country | Date |
|--------|---------|------|
| 619,474 | Germany | Oct. 1, 1935 |